United States Patent
Nakamura

(10) Patent No.: US 10,511,738 B2
(45) Date of Patent: *Dec. 17, 2019

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Tadahiro Nakamura, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/013,216

(22) Filed: Jun. 20, 2018

(65) Prior Publication Data

US 2018/0302529 A1    Oct. 18, 2018

Related U.S. Application Data

(63) Continuation of application No. 15/200,296, filed on Jul. 1, 2016, now Pat. No. 10,038,815.

(30) Foreign Application Priority Data

Jul. 31, 2015    (JP) .................................. 2015-152697

(51) Int. Cl.
H04N 1/00    (2006.01)
H04N 1/32    (2006.01)
(Continued)

(52) U.S. Cl.
CPC ..... *H04N 1/32598* (2013.01); *H04N 1/00217* (2013.01); *H04N 1/00244* (2013.01);
(Continued)

(58) Field of Classification Search
None
See application file for complete search history.

(56) References Cited

U.S. PATENT DOCUMENTS 8,976,402 B2    3/2015    Nakamura
9,137,395 B2    9/2015    Matsumoto
(Continued)

FOREIGN PATENT DOCUMENTS

JP    2003-198779 A    7/2003
JP    2014-103504 A    6/2014
JP    2014-106581 A    6/2014

*Primary Examiner* — Beniyam Menberu
(74) *Attorney, Agent, or Firm* — Venable LLP

(57) ABSTRACT

An image processing apparatus receives print data via a USB interface, receives print data via a network interface, processes an HTTP protocol, receives print data via the USB interface, and controls a printer to perform print processing. When the first print data is not based on IPP, the first print data is transmitted to a print processing module, and when the second print data is based on IPP via a network interface, the second print data is transmitted to a Web server module. When the third print data is based on IPP via the USB interface, the third print data is transmitted to a TCP/IP processing module and transmitted to a Web server module, and when the Web server module receives the second or third print data from the TCP/IP processing module, it transmits the second or third print data to the print processing module.

16 Claims, 13 Drawing Sheets

(51) Int. Cl.
*G06F 3/12* (2006.01)
*G06K 15/02* (2006.01)

(52) U.S. Cl.
CPC ..... *H04N 1/00411* (2013.01); *H04N 1/00464* (2013.01); *H04N 2201/0094* (2013.01)

(56) References Cited

U.S. PATENT DOCUMENTS

| | | | |
|---|---|---|---|
| 9,213,514 | B2 | 12/2015 | Ohara |
| 10,038,815 | B2* | 7/2018 | Nakamura ......... H04N 1/32598 |
| 2006/0158686 | A1 | 7/2006 | Watanabe |
| 2006/0230152 | A1 | 10/2006 | Matsushima |
| 2008/0304486 | A1* | 12/2008 | Graessley ............. H04L 65/608 |
| | | | 370/392 |
| 2008/0307109 | A1* | 12/2008 | Galloway ............... H04L 67/06 |
| | | | 709/232 |
| 2010/0165392 | A1 | 7/2010 | Yabe |
| 2010/0257271 | A1 | 10/2010 | Nakamura et al. |
| 2011/0134456 | A1 | 6/2011 | Tsujimoto |
| 2011/0176163 | A1 | 7/2011 | Towata |
| 2014/0022399 | A1 | 1/2014 | Rashid |
| 2014/0063544 | A1* | 3/2014 | Kadota ................. G06F 13/385 |
| | | | 358/1.15 |
| 2014/0118789 | A1 | 5/2014 | Kadota |
| 2014/0129674 | A1* | 5/2014 | Matsuda ............... H04L 69/321 |
| | | | 709/217 |
| 2014/0139877 | A1* | 5/2014 | Ohara ................... G06F 3/1293 |
| | | | 358/1.15 |
| 2014/0146364 | A1* | 5/2014 | Matsumoto ........ H04N 1/00217 |
| | | | 358/1.15 |
| 2017/0005938 | A1* | 1/2017 | Rimola ............... H04L 67/2823 |

\* cited by examiner

| TCP/IP CONNECTION IDENTIFIER | LOCAL IP | LOCAL PORT | REMOTE IP | REMOTE PORT |
|---|---|---|---|---|
| 1 | 192.168.0.1 | 80 | 192.168.0.2 | 10000 |
| 2 | 127.0.0.1 | 80 | 127.0.0.1 | 20000 |
|  |  |  |  |  |

900

| CONNECTION IDENTIFIER | 100 |
|---|---|

| Web APPLICATION | PORT NUMBER | URL |
|---|---|---|
| IPP | 80 | /ipp/print |
| Scan | 80 | /scan |
| Web PAGE | 80 | /webcontent |

FIG. 14
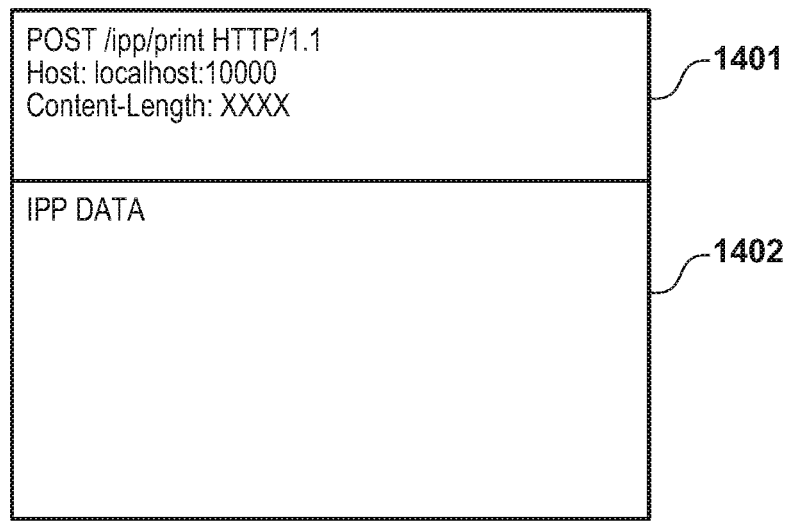
```
POST /ipp/print HTTP/1.1      ─1401
Host: localhost:10000
Content-Length: XXXX
IPP DATA                      ─1402
```
FIG. 15
| Web APPLICATION | PORT NUMBER | URL |
|---|---|---|
| IPP | 631 | /ipp/print |
| Scan | 80 | /scan |
| Web PAGE | 8000 | /webcontent |
FIG. 16
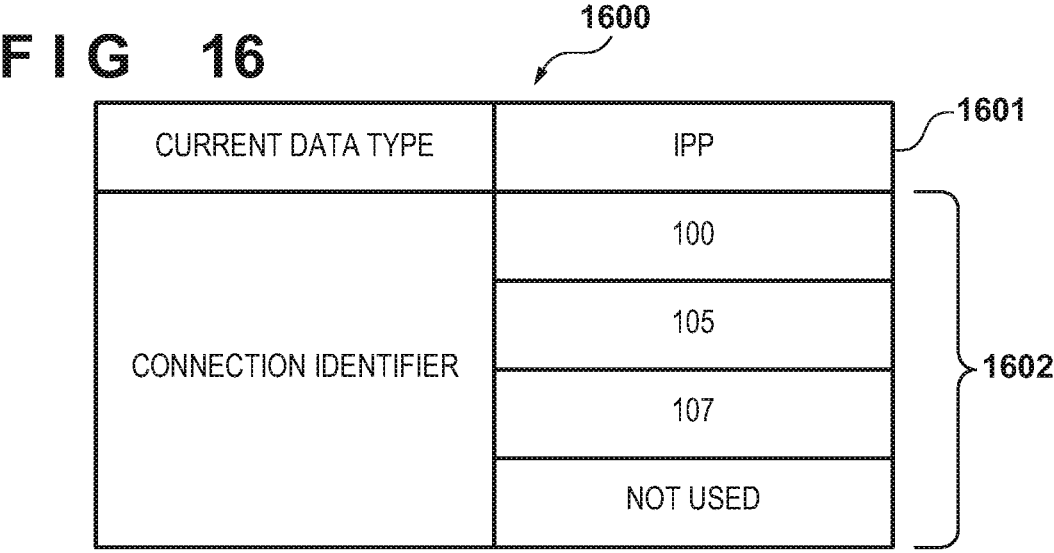
| CURRENT DATA TYPE | IPP | 1601 |
|---|---|---|
| CONNECTION IDENTIFIER | 100 | |
| | 105 | 1602 |
| | 107 | |
| | NOT USED | |

IMAGE FORMING APPARATUS, METHOD OF CONTROLLING THE SAME, AND STORAGE MEDIUM

This application is a continuation of application Ser. No. 15/200,296, filed Jul. 1, 2016.

BACKGROUND OF THE INVENTION

Field of the Invention

The present invention relates to an image forming apparatus, a method of controlling the same, and a storage medium.

Description of the Related Art

Conventionally, an image forming apparatus that includes a USB (Universal Serial Bus) has been widely used. In a USB specification, it is possible to have a plurality of logical channels called endpoints. For example, different endpoints can be assigned to respective functions, such as printing and scanning, provided by the image forming apparatus, and the functions can be used from a host computer via the USB. Japanese Patent Laid-Open No. 2003-198779 discloses a technique that easily implements, via the USB, simultaneous operations of a plurality of functions such as a printer, a scanner, facsimile communication and the like.

In addition, there is an image forming apparatus that has a Web server function or an IPP (Internet Printing Protocol) function. In such an apparatus, setting of the image forming apparatus can be performed by a Web browser via a network, and printing or scanning using IPP can be performed. Furthermore, a specification called IPP over USB that allows IPP originally intended for network usage to be used between a host computer and an image forming apparatus connected via a USB has been defined. Note that IPP over USB can transmit/receive HTTP data including a HTTP header via a USB and is a specification that can be applied not only to IPP but also to other functions operating on HTTP such as scanning or data exchange of a Web page.

When IPP over USB is added to an image forming apparatus already provided with a Web server and IPP, it was necessary to add a processing unit that interprets HTTP data input from a USB. This is because, typically, the Web server can only accept input from TCP/IP, and the originally included Web server cannot be used to interpret data input from the USB.

SUMMARY OF THE INVENTION

An aspect of the present invention is to eliminate the above-mentioned problems with conventional technology.

A feature of the present invention is to provide a technique of transferring data input from a USB to a Web server and executing processing instructed by the data to implement IPP over USB.

According to a first aspect of the present invention, there is provided an image forming apparatus that is connected to an information processing apparatus via a USB, comprising: a transmission/reception unit configured to transmit/receive data to/from the information processing apparatus via the USB; a Web server; a Web application configured to operate on the Web server; a communication unit configured to perform communication by Internet Protocol; and a transfer unit configured to transfer the data received by the transmission/reception unit to the Web server via the communication unit.

According to a second aspect of the present invention, there is provided a method of controlling an image forming apparatus having a Web server, a Web application configured to operate on the Web server and a communication unit configured to perform communication by Internet Protocol, that is connected to an information processing apparatus via a USB, the method comprising: transmitting/receiving data to/from the information processing apparatus via the USB; and transferring the data received in the transmitting/receiving to the Web server via the communication unit, wherein the Web server specifies a Web application that processes the data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 depicts a view showing an example of data from the USB control module that is received by the USB data transfer module of the image forming apparatus according to the first embodiment;

FIG. 15 depicts a view showing an example of information registered to a Web server module by each Web application in an image forming apparatus according to the second embodiment;

FIG. 16 depicts a view showing an example of a connection table managed by a USB data transfer module of the image forming apparatus according to the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[First Embodiment]

Figure 1:
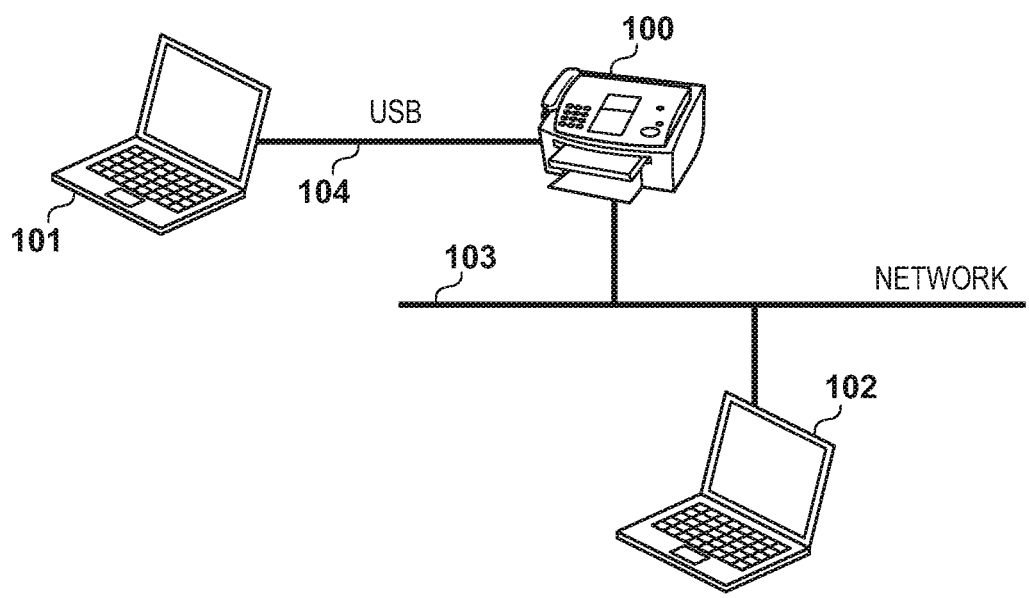
FIG. 1 depicts a view showing an example of a system arrangement according to the first embodiment of the present invention.

FIG. 1 depicts a view showing an example of a system arrangement according to the first embodiment of the present invention.

An image forming apparatus 100 includes a USB I/F and a network I/F. The image forming apparatus 100 is connected to a host computer 101 via a USB cable 104 and performs the instructed processing upon receiving an instruction to print, scan, or the like from the host computer 101. The image forming apparatus 100 is also connected to a host computer 102 via a network 103 and executes processing according to the instruction upon receiving an instruction to print, scan, or the like from the host computer 102. Note that, in the following description, the host computers 101 and 102 have the same arrangement. Hence, a description will be given using the host computer 101 when it is unnecessary to particularly distinguish between them.

Figure 2:
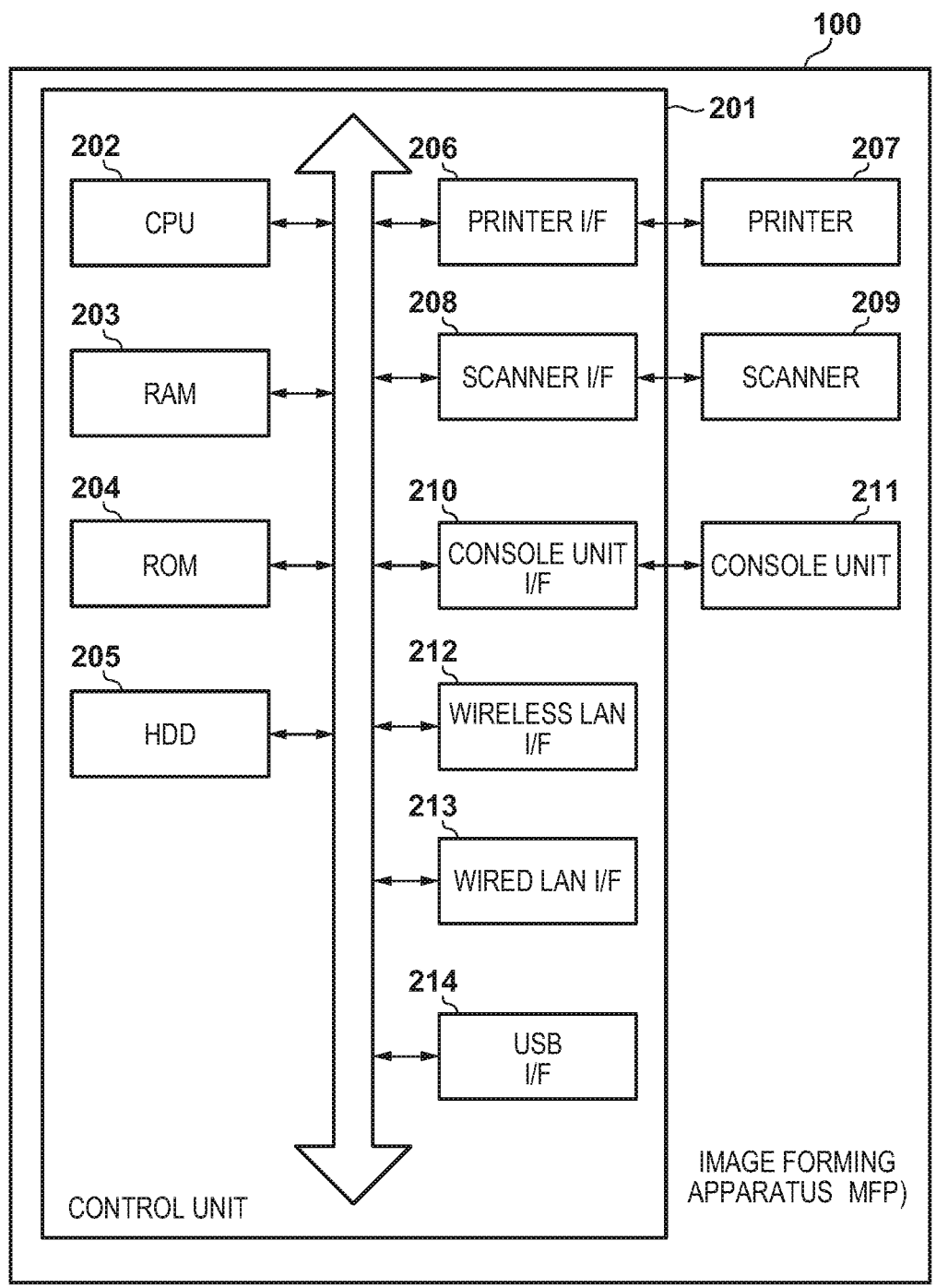
FIG. 2 is a block diagram for describing a hardware arrangement of an image forming apparatus according to the first embodiment.

FIG. 2 is a block diagram for describing the hardware arrangement of the image forming apparatus 100 according to the first embodiment. Note that in the first embodiment, the image forming apparatus 100 will be described using an example of a multi-function peripheral (MFP) that includes a copy function, a scan function, a print function, a box function, a facsimile transmission/reception function, and the like.

A control unit 201 which includes a CPU 202 controls the overall operation of the image forming apparatus 100. The CPU 202 executes a boot program stored in a ROM 204, reads out a program from an HDD 205, deploys the program in a RAM 203, and executes the deployed program to control various processes such as printing and communication. The RAM 203 is used as a main memory or a temporary storage area such as a work area for the CPU 202. The HDD 205 stores data, various programs, or various information tables.

A printer 207 (printer engine) and the control unit 201 are connected by a printer I/F 206. The printer 207 prints on a sheet fed from a paper feed cassette (not shown) based on the print data input via the printer I/F 206. A scanner 209 and the control unit 201 are connected by a scanner I/F 208. The scanner 209 generates image data by reading an image of a document. The image data generated by the scanner 209 is output to and printed by the printer 207, stored in the HDD 205, or transmitted to an external apparatus via a wireless LAN I/F 212 or a wired LAN I/F 213. A console unit 211 and the control unit 201 are connected by a console unit I/F 210. The console unit 211 is provided with a display unit which has a touch panel function, a keyboard, various function keys, and the like. A user can confirm a screen displayed on the console unit 211 and input various kinds of instructions to the image forming apparatus 100 by using the touch panel. The wireless LAN I/F 212 executes wireless communication with an external information apparatus such as a mobile terminal or a PC. The wired LAN I/F 213 is connected to a LAN cable (not shown) and can execute communication with an external information apparatus via the network 103. A USB I/F 214 is connected to an information apparatus (host computer 101 in FIG. 1) via the USB cable 104 and performs USB communication.

The image forming apparatus 100 receives print data from a host computer by such wireless/wired/USB communication and prints using the printer 207 based on the received print data. The image forming apparatus 100 can also transmit image data generated by the scanner 209 to a host computer by wireless/wired/USB communication.

Note that in the image forming apparatus 100 according to the first embodiment, a single CPU 202 executes the processes shown in the respective flowcharts (to be described later) by using a single memory (RAM 203). However, another arrangement may be used. For example, a plurality of CPUs and a plurality of memories may cooperate with each other to execute the processes shown in the respective flowcharts (to be described later).

Figure 3:
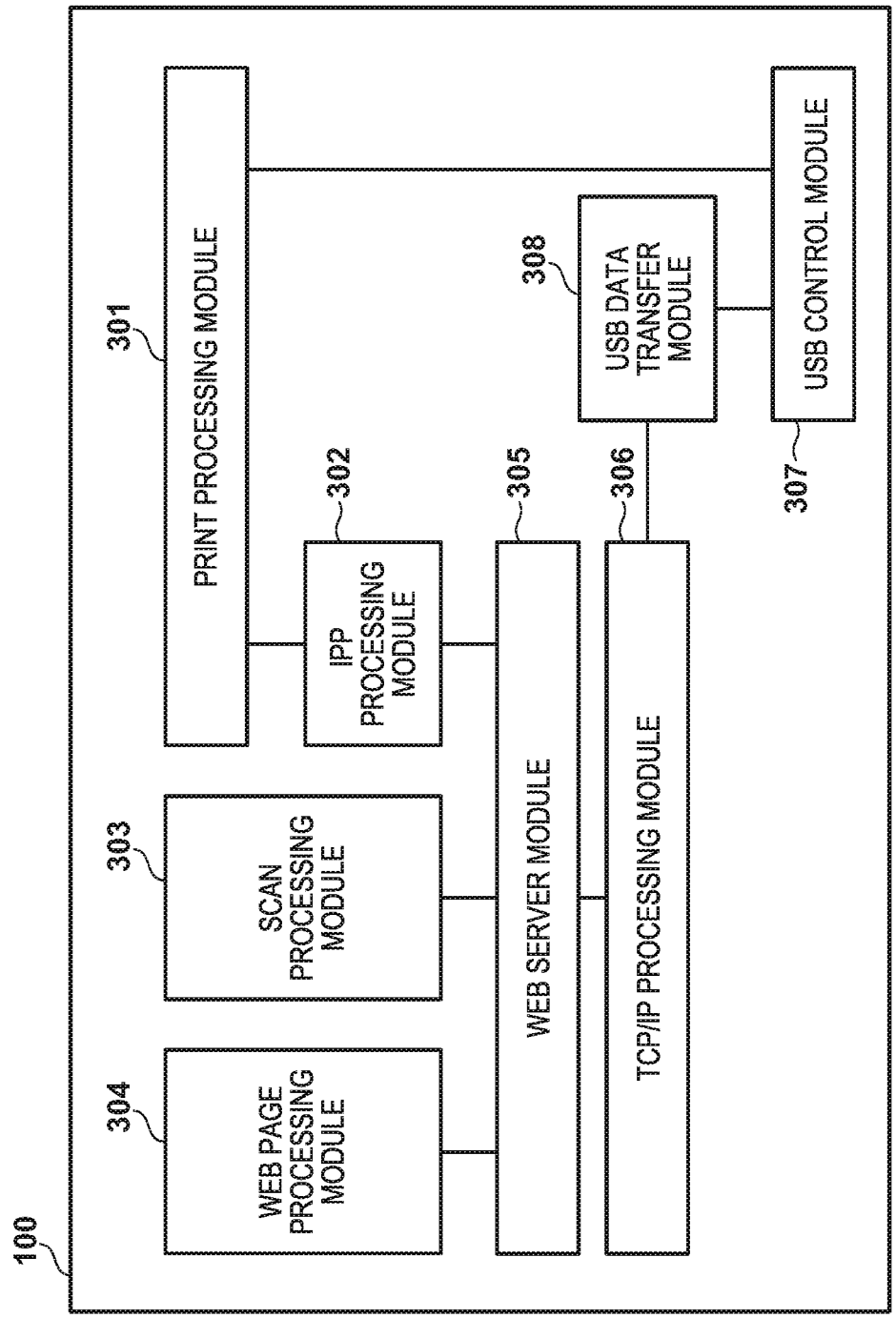
FIG. 3 is a block diagram for describing a software configuration of the image forming apparatus according to the first embodiment.

FIG. 3 is a block diagram for explaining a software configuration of the image forming apparatus 100 according to the first embodiment. Each functional module shown in FIG. 3 is implemented by the CPU 202 which executes a program deployed from the HDD 205 in the RAM 203.

A print processing module 301 interprets the print data received from a USB control module 307 or an IPP processing module 302 and performs print processing by controlling the printer 207. The IPP processing module 302, a scan processing module 303, and a Web page processing module 304 are Web applications that operate on a Web server module 305. Here, a plurality of Web applications are present. The IPP processing module 302 interprets the IPP request data transmitted from the Web server module 305, performs processing in accordance with the IPP operation, generates an IPP response, and transmits the IPP response to the Web server module 305. The scan processing module 303 interprets a scan command transmitted from the Web server module 305 and transmits the image data obtained by the scanner 209 to the Web server module 305. The Web page processing module 304 generates an HTML Web page according to a Web page obtainment request transmitted from the Web server module 305 and transmits the generated Web page to the Web server module 305. The URLs and the port numbers of these Web applications are registered in the Web server module 305 (to be described later with reference to FIG. 13). Note that, in the first embodiment, "80" is registered as the port number for all of the Web applications (IPP processing module 302, scan processing module 303, and Web page processing module 304).

The Web server module 305 has the role of processing an HTTP protocol and returning a response to a request from a client. The Web server module 305 notifies a TCP/IP processing module 306 of the port number registered by a Web application. The TCP/IP processing module 306 performs communication by Internet Protocol and can receive data when the data arrives from the outside to the port number notified by the Web server module 305. Upon receiving data from the TCP/IP processing module 306, the Web server module 305 specifies the appropriate Web application based on the registered information and transmits the data to the specified Web application.

The USB control module 307 performs USB communication with the host computer 101 and transmits the data received from the host computer 101 to the print processing module 301 or a USB data transfer module 308. Upon receiving data from the print processing module 301 or the USB data transfer module 308, the USB control module 307 transmits the data to the host computer 101 via the USB. Upon receiving data from the USB control module 307, the USB data transfer module 308 transmits the data to the TCP/IP processing module 306 by loopback. Upon receiving data from the TCP/IP processing module 306, the USB data transfer module 308 transmits the data to the USB control module 307.

By such a configuration, HTTP data input from the USB is transmitted to the TCP/IP processing module 306 by the USB data transfer module 308, then further transmitted from the TCP/IP processing module 306 to the Web server module 305, and handed over to a corresponding Web application. When the processing based on this HTTP data is executed by the Web application, the result is transmitted to the USB data transfer module 308 via the Web server module 305 and the TCP/IP processing module 306 and then transmitted to the host computer via the USB.

Figure 4:
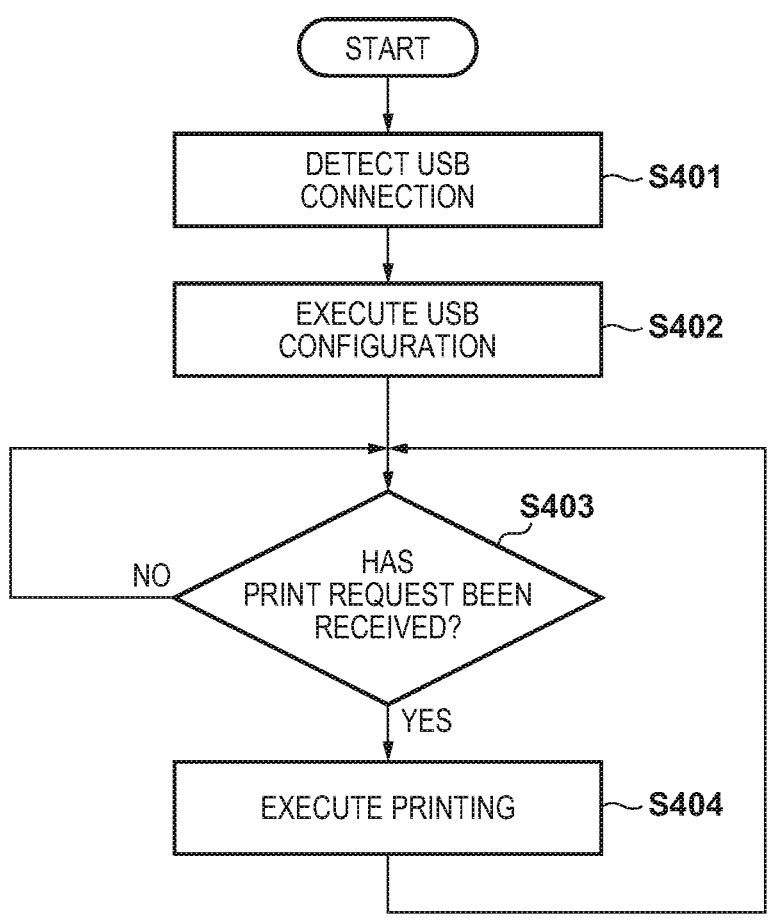
FIG. 4 is a flowchart for describing processing when the image forming apparatus according to the first embodiment receives a print job via a USB until printing is executed.

FIG. 4 is a flowchart for describing processing when the image forming apparatus 100 according to the first embodiment receives a print job via the USB and executes printing. The processing shown in this flowchart is implemented by the CPU 202 which executes a program deployed from the HDD 205 in the RAM 203.

The processing starts when the image forming apparatus 100 is powered-on. First, in step S401, the CPU 202 starts USB initialization processing upon detecting a connection with the host computer 101 via the USB cable 104. Next, the process advances to step S402. In this step, the CPU 202 functions as the USB control module 307 to execute USB configuration (to be described later) with the host computer 101. Then, upon completion of this configuration, the process advances to step S403. In this step, the CPU 202 waits to receive a print request from the host computer 101. Upon receiving the print request, the process advances to step S404. In this step, print processing is performed according to the received print request.

This is an example of general processing between a host computer and an image forming apparatus that are USB-connected.

Figure 5:
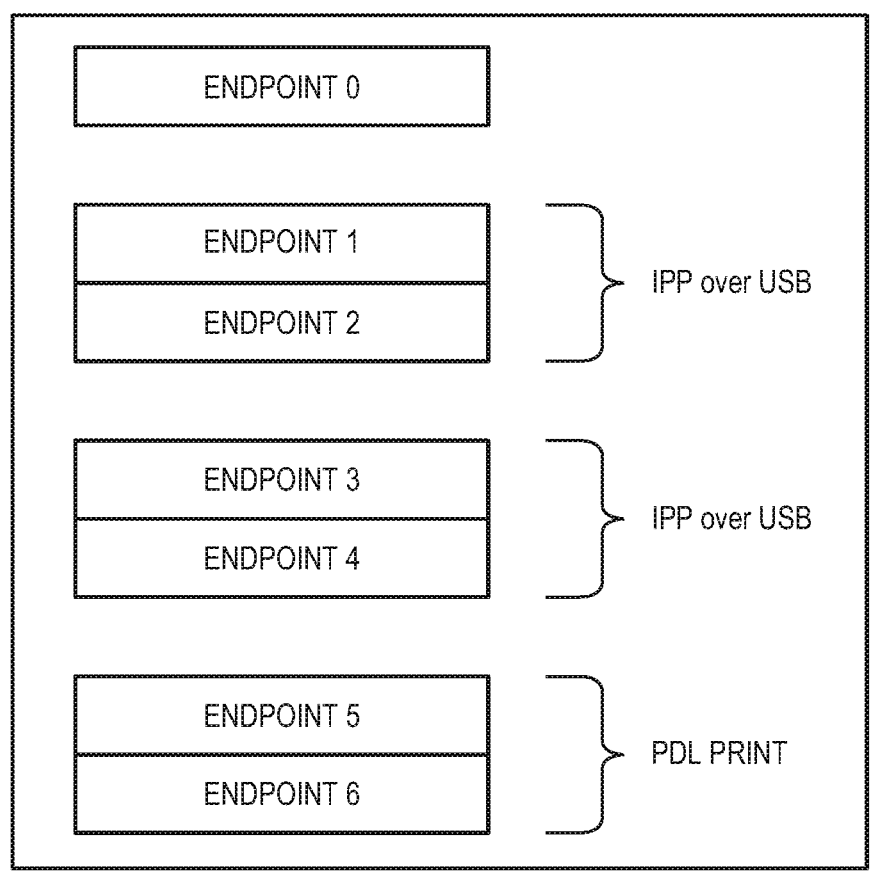
FIG. 5 depicts a view showing an example of configuration information that is exchanged when the image forming apparatus according to the first embodiment and a host computer are USB-connected.

FIG. 5 depicts a view showing an example of configuration information that is exchanged when the image forming apparatus 100 according to the first embodiment and the host computer 101 are USB-connected.

Upon receiving a configuration information obtainment request from the host computer 101, the USB control module 307 of the image forming apparatus 100 responds with, for example, information as that shown in FIG. 5. FIG. 5 shows how the image forming apparatus 100 has seven endpoints. Endpoint 0 is a special bidirectional endpoint to exchange control information of a device. Endpoints other than endpoint 0 are unidirectional, and a transmission endpoint and a reception endpoint are used as a set. Endpoints 1 to 4 are endpoints for IPP over USB, and two simultaneous connections are possible. Endpoint 1 is the first IPP over USB reception endpoint, and endpoint 2 is the first IPP over USB transmission endpoint. Endpoint 3 is the second IPP over USB reception endpoint, and endpoint 4 is the second IPP over USB transmission endpoint. Endpoint 5 is a reception endpoint for PDL printing, and endpoint 6 is a transmission endpoint for PDL printing. Upon receiving these pieces of information, the host computer 101 stores the endpoint information held by the image forming apparatus 100 and determines which endpoints need to be used for data transmission/reception. For example, if the host computer 101 wants to transmit print data by using IPP over USB, data is transmitted to endpoint 1 or endpoint 3 of the image forming apparatus 100.

A feature of the first embodiment is how a sequence (third sequence) of performing IPP printing from the host computer 101 via a USB has been provided. This characteristic sequence and the known sequence (first sequence) of performing IPP printing via a network and the known sequence (second sequence) of performing PDL data printing via a USB will be explained.

Figure 6:
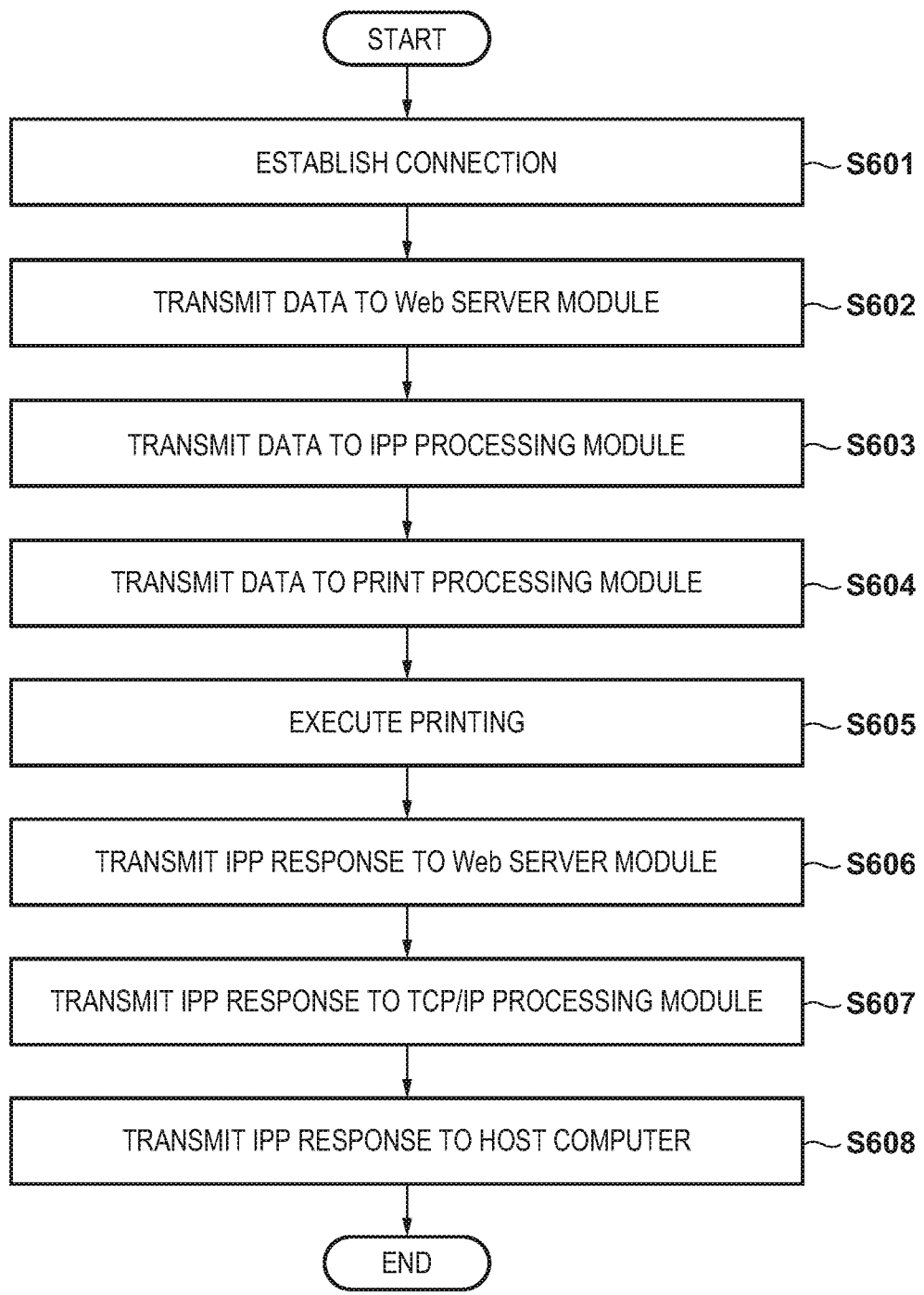
FIG. 6 is a flowchart for describing processing when the image forming apparatus according to the first embodiment receives and prints a print job from the host computer via a network.

FIG. 6 is a flowchart for describing processing (first sequence) when the image forming apparatus 100 according to the first embodiment receives a print job from the host computer 102 via the network 103 and performs printing. The processing shown in this flowchart is implemented by the CPU 202 which executes a program deployed from the HDD 205 in the RAM 203.

The processing starts when the host computer 102 transmits a connection request to the port with the port number "80" of the image forming apparatus 100 via the network 103. First, in step S601, the CPU 202 functions as the TCP/IP processing module 306 to add the connection information to a TCP/IP connection management table 900 (FIG. 9) and establish a connection with the host computer 102. Next, when the host computer 102 transmits an IPP print request and job data to the image forming apparatus 100, the CPU 202 functions as the TCP/IP processing module 306 to receive the request and the data in step S602. The received data is then transmitted to the Web server module 305 associated with the port with the port number "80". Next, the process advances to step S603. In this step, the CPU 202 functions as the Web server module 305 to transmit the print request and the job data to the IPP processing module 302 which is the destination specified in the HTTP header included in the print request. Next, the process advances to step S604. In this step, the CPU 202 functions as the IPP processing module 302 to interpret the print request and transmit the job setting information and the job data included in the interpretation result to the print processing module 301. Subsequently, the process advances to step S605. In this step, the CPU 202 functions as the print processing module 301 to execute the received job data based on the job setting information and control the printer 207 to perform printing.

Next, the process advances to step S606. In this step, the CPU 202 functions as the IPP processing module 302 to generate the IPP response data and transmit the generated IPP response data to the Web server module 305. Then, the process advances to step S607. In this step, the CPU 202 functions as the Web server module 305 to add an HTTP header to the IPP response data and transmit the data to the TCP/IP processing module 306. Subsequently, in step S608, the CPU 202 functions as the TCP/IP processing module 306 to refer to the TCP/IP connection management table 900 and transmit the IPP response data to the host computer 102 serving as the connection partner.

Note that in cases of scanning and display processing of a Web page, the processes can be executed basically in the same manner as those in the above-described print processing. That is, after the host computer 102 is connected to the TCP/IP processing module 306 by designating the port with the port number "80", the host computer 102 transmits a scan request in the case of a scan or a Web page request in the case of a Web page display. The Web server module 305 accordingly specifies a destination from the HTTP header included in the request and transmits the request to either the scan processing module 303 or the Web page processing module 304. In the case of scanning, the scan processing module 303 executes scan processing by controlling the scanner 209 based on the request, generates the response data including the scan data, and transmits the response data to the Web server module 305. On the other hand, in the case of Web page display processing, the Web page processing module 304 generates a Web page based on the request and transmits the generated Web page as the response data to the Web server module 305. The Web server module 305 adds an HTTP header to the response data and transmits the data to the TCP/IP processing module 306. The TCP/IP processing module 306 transmits the response data to the host computer 102 via an already established connection.

Figure 7:
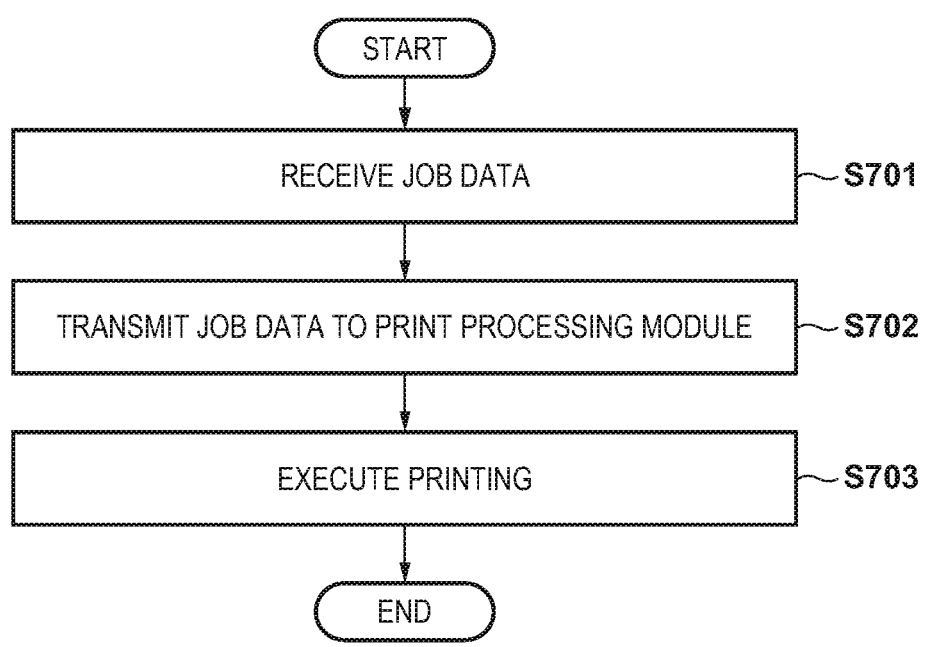
FIG. 7 is a flowchart for describing processing when the image forming apparatus according to the first embodiment receives and prints a print job from the host computer via a USB.

FIG. 7 is a flowchart for describing processing (second sequence) when the image forming apparatus 100 according to the first embodiment receives a print job from the host computer 101 via the USB and performs printing. The processing shown in this flowchart is implemented by the CPU 202 which executes a program deployed from the HDD 205 in the RAM 203.

The processing starts when the host computer 101 transmits job data to the PDL printing reception endpoint (endpoint 5 in the example of FIG. 5) of the USB control module 307 in the image forming apparatus 100 via the USB. First, in step S701, the CPU 202 functions as the USB control module 307 to receive the job data. Next, the process advances to step S702. In this step, the CPU 202 functions as the USB control module 307 to transmit the received job data to the print processing module 301. Subsequently, in step S703, the CPU 202 functions as the print processing module 301 to interpret the received job data and control the printer 207 based on the job data to perform printing.

Note that PDL printing in the first embodiment is by unidirectional communication, and the USB control module 307 will only transmit an ACK response to the host computer 101 at each reception of a job data packet and will never return response data such as that in the aforementioned IPP printing operation.

Figure 8:
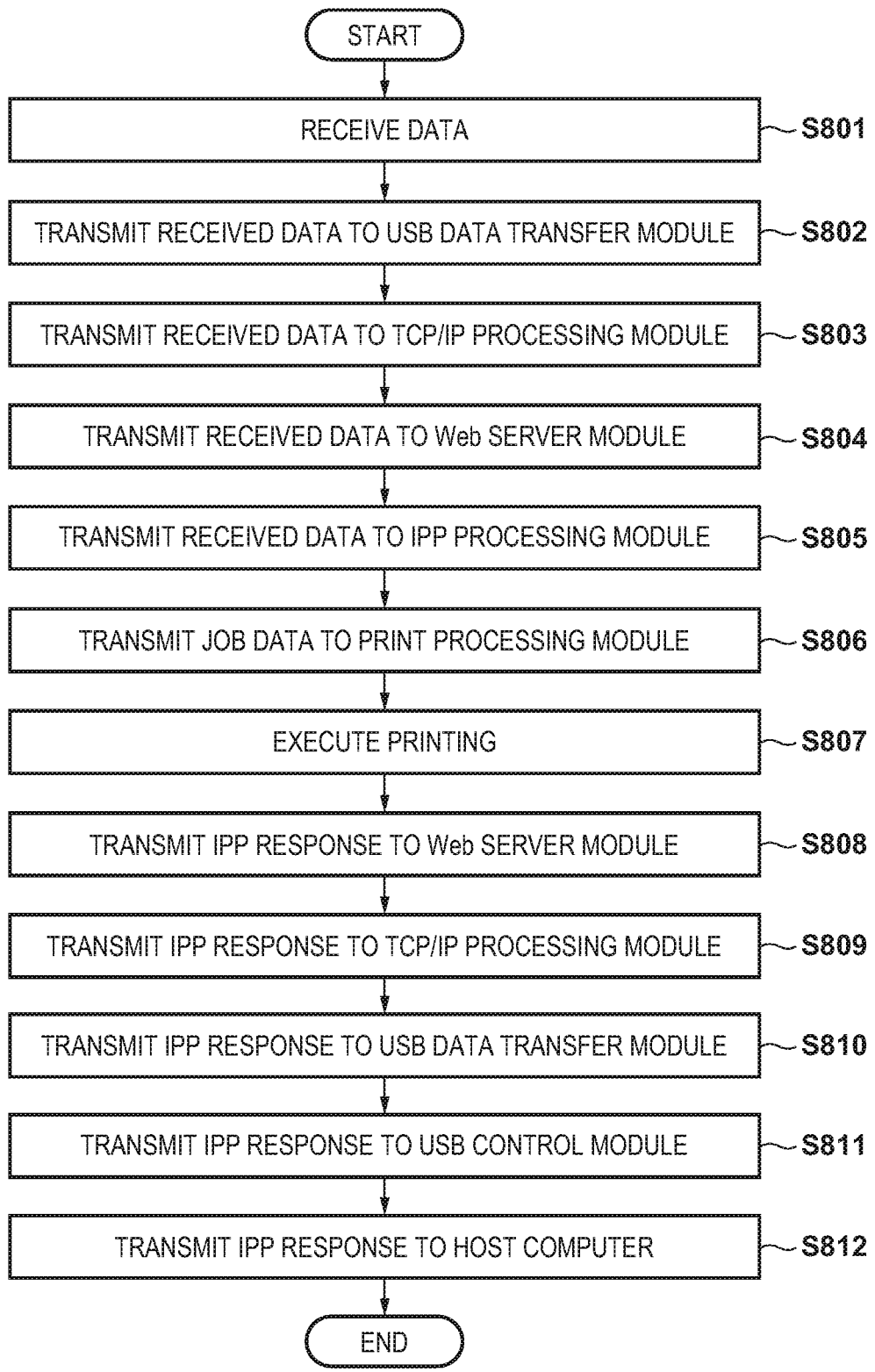
FIG. 8 is a flowchart for describing processing when the image forming apparatus according to the first embodiment executes IPP printing via USB from the host computer.

FIG. 8 is a flowchart for describing processing (third sequence) when the image forming apparatus 100 according to the first embodiment executes IPP printing from the host computer 101 via a USB. This processing is implemented by the CPU 202 which executes a program deployed from the HDD 205 in the RAM 203.

The processing starts when the host computer 101 transmits an IPP print request and job data to the IPP printing reception endpoint (endpoint 3) of the USB control module 307 of the image forming apparatus 100 via the USB. First, in step S801, the CPU 202 functions as the USB control module 307 to receive an IPP print request and job data. Next, the process advances to step S802. In this step, the CPU 202 functions as the USB control module 307 to transmit the received print request and the job data to the USB data transfer module 308.

FIG. 14 depicts a view showing an example of data from the USB control module 307 that is received by the USB data transfer module 308 of the image forming apparatus 100 according to the first embodiment received from the USB control module 307.

This data includes an HTTP header 1401 and an HTTP body 1402. The top first row of the HTTP header 1401 is the request line and stores HTTP method information and URL information. In the case of IPP, the HTTP body 1402 includes various kinds of data for each operation such as printing defined by IPP and obtaining job information.

In the example of FIG. 14, "/ipp/print" indicating the URL of the IPP (refer to FIG. 13) is written in the first row request line, and the request can be determined to be an IPP print request.

Next, the process advances to step S803. In this step, the CPU 202 functions as the USB data transfer module 308 to establish a connection between the TCP/IP processing module 306 and the port with the port number "80" by loopback and transmit the received print request and the job data to the TCP/IP processing module 306. Then, the process advances to step S804. In this step, the CPU 202 functions as the TCP/IP processing module 306 to receive the print request and the job data and transmit the received print request and job data to the Web server module 305 associated with the port with the port number "80". Next, the process advances to step S805. In this step, the CPU 202 functions as the Web server module 305 to transmit the print request and the job data to the IPP processing module 302 which is the destination that has been specified from the HTTP header included in the print request. Then, in step S806, the CPU 202 functions as the IPP processing module 302 to interpret the print request and transmit the job setting information and the job data included in the interpretation result to the print processing module 301. Subsequently, in step S807, the CPU 202 functions as the print processing module 301 to execute and print the received job data based on the job setting information.

Next, the process advances to step S808. In this step, the CPU 202 functions as the IPP processing module 302 to generate the IPP response data and transmit the generated data to the Web server module 305. Then, in step S809, the CPU 202 functions as the Web server module 305 to add an HTTP header to the IPP response data and transmit the data to the TCP/IP processing module 306. Next, the process advances to step S810. In this step, the CPU 202 functions as the TCP/IP processing module 306 to refer to the TCP/IP connection management table 900 and transmit the IPP response data to the USB data transfer module 308 serving as the connection partner. Subsequently, the process advances to step S811. In this step, the CPU 202 functions as the USB data transfer module 308 to transmit the received IPP response data to the USB control module 307. Finally, in step S812, the CPU 202 functions as the USB control module 307 to transmit the IPP response data to the host computer 101 via the USB, and this processing ends.

As described above, according to the first embodiment, a print request that has been received via a USB is processable by transferring the request to the Web server module 305. This allows easy implementation of the IPP over USB function without having to newly add a configuration to interpret HTTP data.

Figures 9, 10:
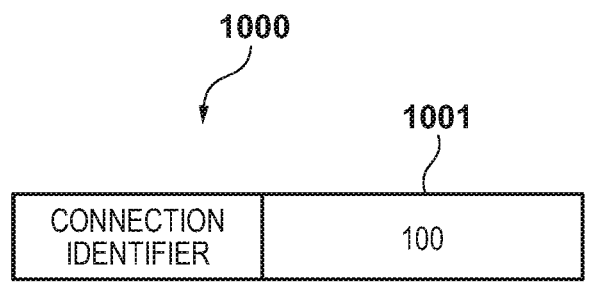
FIG. 9 depicts a view showing an example of a TCP/IP connection management table held by a TCP/IP processing module of the image forming apparatus according to the first embodiment.
FIG. 10 depicts a view showing an example of a connection table managed by a USB data transfer module of the image forming apparatus according to the first embodiment.

FIG. 9 depicts a view showing an example of the TCP/IP connection management table 900 held by the TCP/IP processing module 306 of the image forming apparatus 100 according to the first embodiment.

A TCP/IP connection identifier 901 is an identifier assigned by the TCP/IP processing module 306 each time a connection is established. The Web server module 305 or the like performs transmission/reception of data with the TCP/IP processing module 306 by designating this identifier. A local IP 902 is the IP address of the image forming apparatus 100. In a connection established via the network 103, a unique address is used in the network. On the other hand, in a loopback connection between the USB data transfer module 308 and the TCP/IP processing module 306 of the first embodiment, the TCP/IP connection identifier 901 is "2", and "127.0.0.1" is used as the IP address. A local port 903 is the port number that the image forming apparatus 100 receives data for printing or the like and is "80" in the first embodiment. A remote IP 904 is the IP address of the partner with which the connection has been established. In the case of a connection via the network 103, the IP address of the host computer 102 is "192.168.0.2". In the case of a loopback connection, the IP address is "127.0.0.1". A remote port 905 is the port number of the partner with which connection has been established and is normally assigned by the OS of the communication partner each time a connection is established.

The TCP/IP processing module 306 determines the destination to transmit the IPP response data received from the Web server module 305 by referring to this TCP/IP connection management table 900. For example, if an IPP response whose TCP/IP connection identifier 901 is "1" is received from the Web server module 305, its connection remote IP is "192.168.0.2". The IPP response data is transmitted to the host computer 102 on the network 103 based on this information. If an IPP response whose TCP/IP connection identifier 901 is "2" is received from the Web server module 305, its connection remote IP is "127.0.0.1". In this case, the IPP response data is transmitted to the USB data transfer module 308 by loopback.

Next, the flowchart of FIG. 8 will be further described in detail.

FIG. 10 depicts a view showing an example of a connection table 1000 managed by the USB data transfer module 308 of the image forming apparatus 100 according to the first embodiment.

The connection identifier information ("100" in FIG. 10) obtained when the USB data transfer module 308 has established connection with the TCP/IP processing module 306 is held in a connection identifier 1001 of this connection table 1000.

Figure 11:
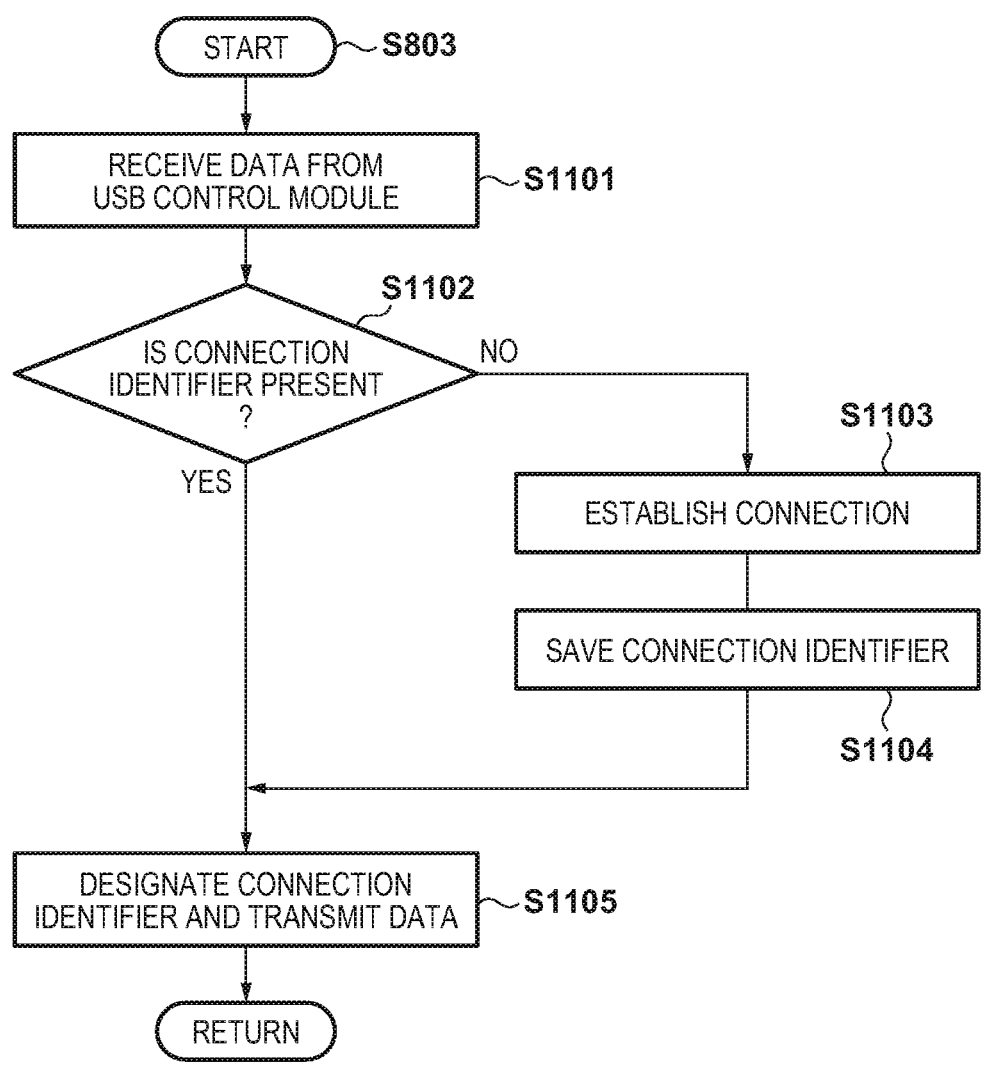
FIG. 11 is a flowchart for describing processing when the USB data transfer module of the image forming apparatus according to the first embodiment transmits data received from a USB control module to the TCP/IP processing module.

FIG. 11 is a flowchart for describing processing when the USB data transfer module 308 of the image forming apparatus 100 according to the first embodiment transmits data received from the USB control module 307 to the TCP/IP processing module 306. FIG. 11 describes in detail the process of step S803 in FIG. 8. Note that the processing shown in this flowchart is implemented by the CPU 202 which executes a program deployed from the HDD 205 in the RAM 203.

The processing starts when the host computer 101 transmits data to the USB control module 307 by designating endpoint 1 or 3.

First, in step S1101, the CPU 202 functions as the USB data transfer module 308 to receive the data transmitted from the USB control module 307. Next, the process advances to step S1102. In this step, the CPU 202 functions as the USB data transfer module 308 to determine whether or not the connection identifier 1001 of the connection established with the TCP/IP processing module 306 is present in the connection table 1000. If it is determined that the connection identifier is not present, the process advances to step S1103. In this step, the CPU 202 functions as the USB data transfer module 308 to establish a connection with the TCP/IP processing module 306 by loopback by designating the port number "80". Subsequently, the process advances to step S1104. In this step, the CPU 202 functions as the USB data transfer module 308 to save the connection identifier of the established connection in the connection table 1000, and the process advances to step S1105.

On the other hand, if it is determined in step S1102 that the connection identifier 1001 is present in the connection table 1000 or if step S1104 is executed, the process advances to step S1105. In step S1105, the CPU 202 functions as the USB data transfer module 308 to designate the connection identifier and transmit the received data to the TCP/IP processing module 306, and the processing ends.

Figures 12, 13:
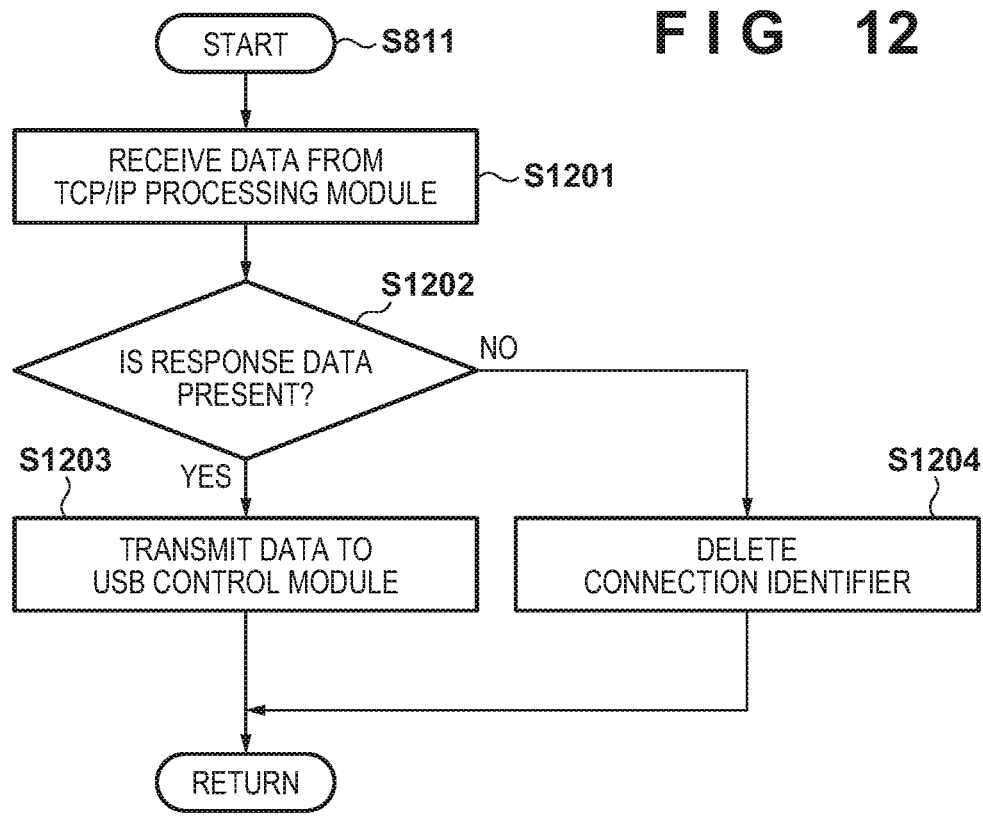
FIG. 12 is a flowchart for describing processing when the USB data transfer module of the image forming apparatus according to the first embodiment transmits data received from the TCP/IP processing module to the USB control module.
FIG. 13 depicts a view showing an example of information registered to a Web server module by a Web application in the image forming apparatus according to the first embodiment.

FIG. 12 is a flowchart for describing processing when the USB data transfer module 308 of the image forming apparatus 100 according to the first embodiment transmits data received from the TCP/IP processing module 306 to the USB control module 307. FIG. 12 describes in detail the process of step S811 in FIG. 8. Note that the processing shown in this flowchart is implemented by the CPU 202 which executes a program deployed from the HDD 205 in the RAM 203.

In step S1201, the CPU 202 functions as the USB data transfer module 308 to detect that it has received data from the TCP/IP processing module 306 in a connection identified by the connection identifier 1001. The data received here can either be response data or data to disconnect the connection. Next, the process advances to step S1202. In this step, the CPU 202 functions as the USB data transfer module 308 to determine whether or not the received data is response data. If the received data is the response data, the process advances to step S1203. In this step, the CPU 202 functions as the USB data transfer module 308 to transmit the received data to the USB control module 307, and the processing ends. On the other hand, if the received data is not the response data in step S1202, the process advances to step S1204 since this data is data to disconnect the connection. In this step, the CPU 202 functions as the USB data transfer module 308 to delete the connection identifier 1001 from the connection table 1000, and the processing ends.

FIG. 13 depicts a view showing an example of information registered to the Web server module 305 by each Web application of the image forming apparatus 100 according to the first embodiment.

Registration information 1300 includes Web application 1301, port number 1302, and URL 1303. Here, Web applications (IPP, Scan, and Web page) corresponding to the IPP processing module 302, the scan processing module 303, and the Web page processing module 304 in FIG. 3 are registered. As described above, all the Web applications have "80" registered as their respective port numbers.

As described above, according to the first embodiment, the USB data transfer module 308 transmits HTTP data received from the USB control module 307 to a predetermined port of the TCP/IP processing module 306 by loopback. The HTTP data is transmitted from the TCP/IP processing module 306 to the Web server module 305 and handed over to the corresponding Web application and processed. In addition, the response from the Web application via the Web server module 305 and the TCP/IP processing module 306 is transmitted to the USB control module 307. As a result, printing, scanning, Web page data, and the like in compliance with IPP over USB can be performed without having to newly add a processing unit for interpreting HTTP data.

[Second Embodiment]

The above-described first embodiment had a configuration in which all of the Web applications used the same port number 80. However, a different port number may be used for each Web application. Since the concept of a port number is nonexistent in IPP over USB, this kind of configuration is problematic in that the USB data transfer module 308 will not know which port number to transmit the data received from the USB control module 307. Hence, in the second embodiment, a USB data transfer module 308 analyzes the header portion of the data and transmits the data to an appropriate port number each time it receives data from a USB control module 307. Note that the system arrangement and the arrangement of an image forming apparatus 100 according to the second embodiment are the same as those in the first embodiment, and a description thereof will be omitted. Only differences will be described.

FIG. 15 depicts a view showing an example of information registered by each Web application to a Web server module 305 in the image forming apparatus 100 according to the second embodiment of the present invention.

In the second embodiment, assume that the Web applications use different port numbers in the following manner; the port number of an IPP processing module 302 is "631", the port number of a scan processing module 303 is "80", and the port number of a Web page processing module 304 is "8000".

FIG. 16 depicts a view showing an example of a connection table managed by the USB data transfer module 308 of the image forming apparatus 100 according to the second embodiment.

In a connection table 1600, reference numeral 1601 indicates the type of data (IPP/scan/Web page) that is to be transmitted by the USB data transfer module 308 to a TCP/IP processing module 306. Reference numeral 1602 indicates the connection identifiers that have established a connection with the TCP/IP processing module 306. In the second embodiment, the USB data transfer module 308 establishes a connection each time an HTTP request line is detected, and the USB data transfer module 308 holds a plurality of connection identifiers.

Figure 17:
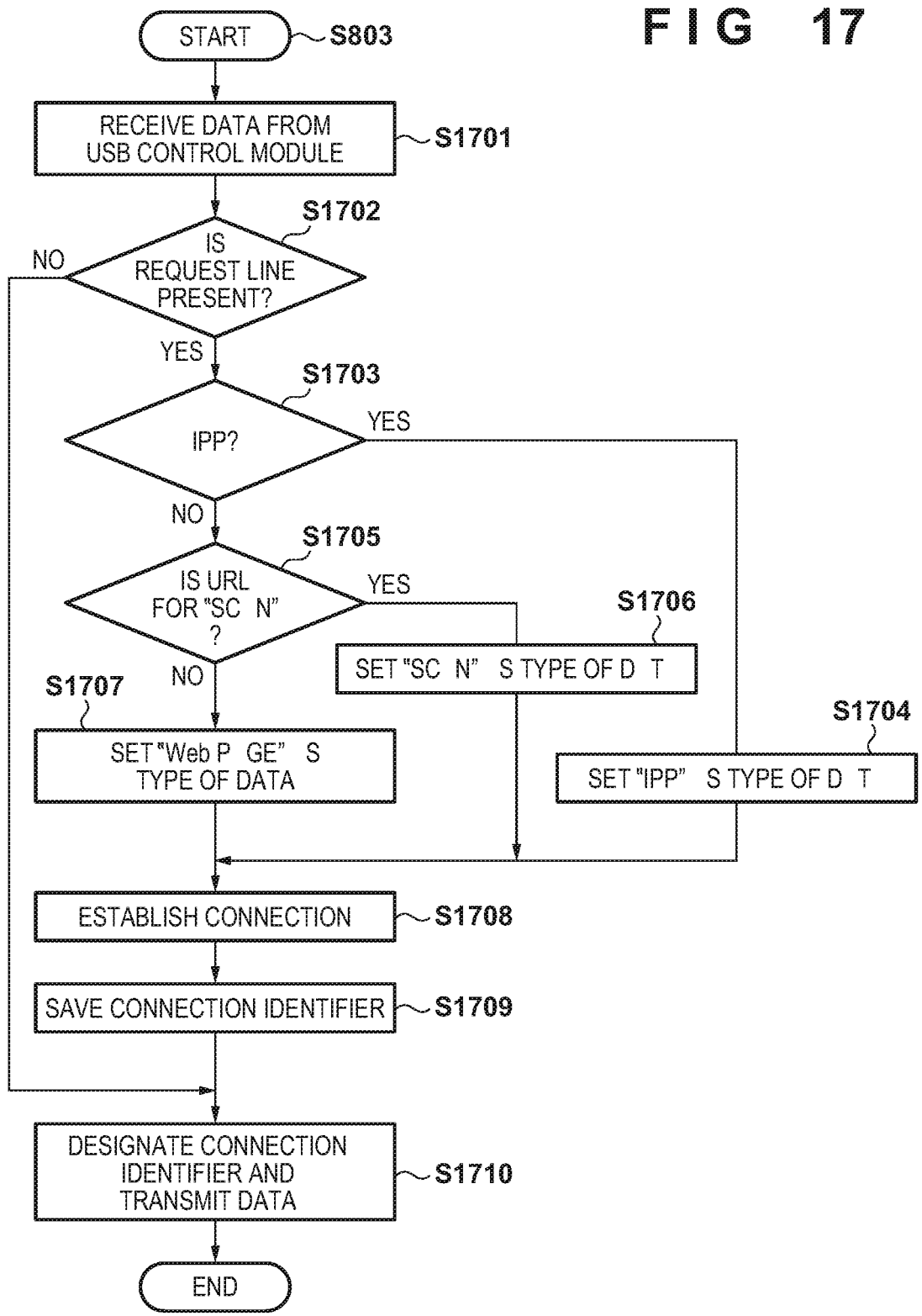
FIG. 17 is a flowchart for describing processing when the USB data transfer module of the image forming apparatus according to the second embodiment transmits data received from a USB control module to a TCP/IP processing module.

FIG. 17 is a flowchart for describing processing when the USB data transfer module 308 of the image forming apparatus 100 according to the second embodiment transmits data received from the USB control module 307 to the TCP/IP processing module 306. FIG. 17 describes in detail the process of step S803 in FIG. 8. Note that the processing shown in this flowchart is implemented by a CPU 202 which executes a program deployed by an HDD 205 in a RAM 203.

The processing starts when a host computer 101 designates endpoint 1 or 3 and transmits data to the USB control module 307. First, in step S1701, the CPU 202 functions as the USB data transfer module 308 to receive the data received by the USB control module 307. Next, in step S1702, the CPU 202 functions as the USB data transfer module 308 to determine whether or not the header of the received data is an HTTP request line. Since the HTTP request line is a character string "method"+"space"+"URL"+"HTTP/version", whether the data matches this pattern is determined. For example, in the example of FIG. 14, the method is "POST", the URL is the URL of IPP in FIG. 13 (/ipp/print), HTTP/version is "HTTP/1.1". Here, if the data has been determined to match this pattern, it is determined that the received data is a new HTTP request, and the process advances to step S1703. Otherwise, the received data is determined to be the same type as the previously received data, and the process advances to step S1710.

In step S1703, the CPU 202 functions as the USB data transfer module 308 to determine whether or not the URL is the URL of IPP ("/ipp/print" in FIG. 15). If the URL is the URL of IPP, the process advances to step S1704. In this step, the CPU 202 functions as the USB data transfer module 308 to set the data type 1601 of the connection table of FIG. 16 to "IPP", and the process advances to step S1708. On the other hand, in step S1703, if it is determined that the URL is not the URL of "IPP", the process advances to step S1705. In this step, the CPU 202 functions as the USB data transfer module 308 to determine whether or not the URL is the URL for scanning ("/scan" in FIG. 15). If the URL is the URL for scanning, the process advances to step S1706. In this step, the CPU 202 functions as the USB data transfer module 308 to set "scan" to the data type 1601 in the connection table of FIG. 16, and the process advances to step S1708. In step S1705, if it is determined that the URL is not the URL for scanning, the process advances to step S1707. In this step, the CPU 202 functions as the USB data transfer module 308 to set "Web page" to the data type 1601 in the connection table of FIG. 16, and the process advances to step S1708.

In step S1708, the CPU 202 functions as the USB data transfer module 308 to establish a connection with the TCP/IP processing module 306. At this time, the CPU 202 refers to the information shown in FIG. 15 and designates the port number "631" if the type of data is "IPP", the port number "80" if the type of data is "scan", or the port number "8000" if the type of data is "Web page". Then, in step S1709, the CPU 202 functions as the USB data transfer module 308 to save the connection identifier of the established connection in the connection table 1600. Subsequently, in step S1710, the CPU 202 functions as the USB data transfer module 308 to designate the connection identifier and transmit the received data to the TCP/IP processing module 306, and the processing is ended.

As described above, according to the second embodiment, the USB data transfer module 308 analyzes the header portion of the data each time it receives data from the USB control module 307 and transmits data to the appropriate port number. As a result, even in a case in which different port numbers are assigned for Web applications, printing, scanning, Web page data or the like in compliance with IPP over USB can be performed on the USB.

In the above-described embodiments, the USB data transfer module 308 is connected to the TCP/IP processing module 306 by loopback. However, a Web server module 305 may directly transmit/receive data to/from the USB data transfer module 308 without loopback.

In addition, in the second embodiment, the USB data transfer module 308 analyzes the HTTP request line. Subsequently, an HTTP header indicating that the data is from the USB data transfer module 308 may be inserted in the HTTP request line and transmitted to the TCP/IP processing module 306. This will allow the Web server module 305 or each Web application to determine whether data has been received via the USB or via the network, and it becomes possible to switch the processing.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-152697, filed Jul. 31, 2015, which is hereby incorporated by reference herein in its entirety.

What is claimed is:

1. An image processing apparatus, comprising:
    a printer;
    a USB interface;
    a network interface connected to a network;
    a memory that stores a program; and
    a processor that executes the program to function as:
    a USB control module that receives print data via the USB interface;
    a TCP/IP processing module that receives print data via the network interface;
    a Web server module that processes an HTTP protocol; and
    a print processing module that controls the printer to perform print processing,
    wherein in a case that the USB control module receives first print data not based on IPP via the USB interface, the USB control module transmits the first print data to the print processing module,
    wherein in a case that the TCP/IP processing module receives second print data based on IPP via the network interface, the TCP/IP processing module transmits the second print data to the Web server module,
    wherein in a case that the USB control module receives third print data based on IPP via the USB interface, the USB control module transmits the third print data to the TCP/IP processing module and the TCP/IP processing module transmits the third print data to the Web server module; and
    wherein the second and third print data from the TCP/IP processing module are transmitted to the print processing module via the Web server module.

2. The image processing apparatus according to claim 1, wherein
    the USB control module transmits the first print data received via the USB interface to the print processing module and transmits the third print data received via the USB interface to the TCP/IP processing module, based on an endpoint designated by a transmission source of the print data.

3. The image processing apparatus according to claim 1, wherein
    in a case where the TCP/IP processing module receives the second print data from a first host computer via the network interface and the TCP/IP processing module transmits the second print data to the Web server module, the TCP/IP processing module transmits response data based on IPP to the first host computer via the network interface and
    in a case where the USB processing module receives the third print data from the second host computer via the USB interface, the USB processing module transmits the third print data to the TCP/IP processing module, the TCP/IP processing module transmits the third print data to the Web server module, and the TCP/IP module transmits the response data based on IPP to the second host computer via the USB interface.

4. The image processing apparatus according to claim 1, wherein
    in a case where the Web server module receives the second or third print data from the TCP/IP processing module, the Web server module transmits the second or third print data to an IPP processing module, and the IPP processing module transmits the second or third print data to the print processing module.

5. The image processing apparatus according to claim 1, wherein
    the print processing module controls the printer to perform print processing based on the second or the third print data transmitted via the Web server module.

6. The image processing apparatus according to claim 1, wherein
    the USB control module transmits the third print data to the TCP/IP processing module by designating a specific port number.

7. The image processing apparatus according to claim 1, wherein
    the USB control module determines a port number based on information included in a header of the third print data and designates the port number to transmit the third print data to the TCP/IP processing module.

8. An image processing apparatus, comprising:
    a printer;
    a USB interface;
    a network interface connected to a network;
    a memory that stores a program; and
    a processor that executes the program to function as:
    a TCP/IP processing module that receives print data via the network interface;
    a Web server module that processes an HTTP protocol;
    a USB control module that receives print data via the USB interface; and
    a print processing module that controls the printer to perform print processing,
    wherein in a case that the USB control module receives a first type of print data via the USB interface, the USB control module transmits the first type of print data to the print processing module, wherein in a case that the TCP/IP processing module receives a second type of print data via the network interface, the TCP/IP processing module transmits the second type of print data to the Web server module,
wherein in a case that the USB control module receives the second type of print data via the USB interface, the USB control module transmits the second type of print data to the TCP/IP processing module and the TCP/IP processing module transmits the second type of print data to the Web server module; and
wherein the second type of print data from the TCP/IP processing module is transmitted to the print processing module via the Web server module.

9. The image processing apparatus according to claim 8, wherein
the USB control module transmits the first type of print data received via the USB interface to the print processing module and transmits the second type of print data received via the USB interface to the TCP/IP processing module, based on an endpoint designated by a transmission source of the print data.

10. The image processing apparatus according to claim 8, wherein
in a case where the TCP/IP processing module receives the second type of print data from a first host computer via the network interface and the TCP/IP processing module transmits the second type of print data to the Web server module, the TCP/IP processing module transmits response data based on IPP to the first host computer via the network interface, and
in a case where the USB processing module receives the second type of print data from the second host computer via the USB interface, the USB processing module transmits the second type of print data to the TCP/IP processing module, the TCP/IP processing module transmits the second type of print data to the Web server module, and the TCP/IP module transmits the response data based on IPP to the second host computer via the USB interface.

11. The image processing apparatus according to claim 8, wherein
in a case where the Web server module receives the second type of print data from the TCP/IP processing module, the Web server module transmits the second type of print data to an IPP processing module, and the IPP processing module transmits the second type of print data or a third type of print data to the print processing module.

12. The image processing apparatus according to claim 8, wherein
the print processing module controls the printer to perform print processing based on the second type of print data transmitted via the Web server module.

13. The image processing apparatus according to claim 8, wherein
the USB control module transmits the second type of print data to the TCP/IP processing module by designating a specific port number.

14. The image processing apparatus according to claim 8, wherein
the USB control module determines a port number based on information included in a header of the second type of print data and designates the port number to transmit the second type of print data to the TCP/IP processing module.

15. A method of controlling an image processing apparatus including
a printer;
a USB interface;
a network interface connected to a network;
a memory that stores a program; and
a processor that executes the program to function as:
a TCP/IP processing module;
a Web server module that processes an HTTP protocol; and
a print processing module that controls the printer to perform print processing,
the method comprising:
in a case that first print data not based on IPP is received via the USB interface, transmitting the first print data to the print processing module;
in a case that second print data based on IPP is received via the network interface, transmitting, for the TCP/IP processing module, the second print data to the Web server module;
in a case that third print data based on IPP is received via the USB interface, transmitting the third print data to the TCP/IP processing module and transmitting, for the TCP/IP processing module, the third print data to the Web server module; and
the second and third print data from the TCP/IP processing module are transmitted to the print processing module via the Web server module.

16. A method of controlling an image processing apparatus including
a printer;
a USB interface;
a network interface connected to a network;
a memory that stores a program; and
a processor that executes the program to function as:
a TCP/IP processing module;
a Web server module that processes an HTTP protocol; and
a print processing module that controls the printer to perform print processing,
the method comprising:
in a case that a first type of print data is received via the USB interface, transmitting the first type of print data to the print processing module;
in a case that a second type of print data is received via the network interface, transmitting, for the TCP/IP processing module, the second type of print data to the Web server module;
in a case that the second type of print data is received via the USB interface, transmitting the second type of print data to the TCP/IP processing module and transmitting, for the TCP/IP processing module, the second type of print data to the Web server module; and
the second type of print data from the TCP/IP processing module is transmitted to the print processing module via the Web server module.

* * * * *